United States Patent Office 3,356,507
Patented Dec. 5, 1967

3,356,507
LACTALBUMIN PHOSPHATE LIPID COMPLEX
Winston H. Wingerd, Elgin, Ill., assignor to The Borden Company, New York, N.Y., a corporation of New York
No Drawing. Filed June 12, 1964, Ser. No. 374,832
9 Claims. (Cl. 99—139)

This invention relates to emulsifying agents and has particular reference to complexes of lactalbumin with non-proteinaceous edible emulsifiers.

Emulsifiers are commonly used in many food products such as high fat toppings, salad dressing, and bakery products. Most food grade emulsifiers, however, are non-nutritive and many are also synthetic products whose use is limited in foods by Federal food and drug regulations. Attempts to use proteins which have a nutritive value as emulsifying agents have not been successful either because the lipoproteins, such as those found in egg yolk or soya lecithin, affect the flavor of the product, or the amount to be added in order to obtain an emulsifying effect is too great.

A protein emulsifying agent has now been found that is bland, nutritious, and has high emulsifying activity.

Briefly stated, the present invention comprises as an emulsifying agent a complex comprising a non-proteinaceous edible emulsifier with a protein selected from the group consisting of undenatured lactalbumin and lactalbumin phosphate, the process of making such products, and food products containing such complexes.

The lactalbumin and lactalbumin phosphate used are preferably in undenatured and water-soluble form. The phosphate in the lactalbumin phosphate is also preferably a polyphosphate in which the $P_2O_5$ content is 67% or greater, examples being Graham's salt and combinations of sodium metaphospahte and potassium polymetaphosphate.

The emulsifier used must be edible and non-proteinaceous. Examples that illustrate the class of materials to be used are mono-, di-, and triesters of $C_{12}$–$C_{20}$ monocarboxylic fatty acids with glycerin and other non-toxic polyhydric alcohols having not more than 6 carbon atoms to the molecule, lactylated glycerol esters of $C_{12}$–$C_{20}$ monocarboxylic fatty acids, polyoxyethylene derivatives of $C_{12}$–$C_{20}$ monocarboxylic saturated fatty acids, phospholipids, polyoxyethylene sorbitan tristearate having 3–20 ethylene oxide units to the molecule, mono-, di- and triesters of $C_4$–$C_{12}$ sugar with a $C_{12}$–$C_{20}$ saturated monocarboxylic fatty acid, and stearyl-2-lactylic acid. Specific examples are glycerol monopalmitate, monooleate, monolaurate, and monostearate and the corresponding di- and triesters of glycerine; the esters of said acids with propylene glycol and sorbitol; glycerol lacto monopalmitate; glycerol lacto stearate; lecithin; MYRJ; TWEEN: sucrose mono-, di-, and tripalmitate, and the mono-, di-, and triesters of $C_{12}$–$C_{20}$ saturated monocarboxylic fatty acids with sorbose, dextrose, levulose, lactose, and maltose. It is preferred to use the glycerol monoesters of $C_{12}$–$C_{20}$ monocarboxylic fatty acids.

As to proportions, the complex consists of about 10 to about 50 parts by weight of non-proteinaceous emulsifier and the remainder lactalbumin or lactalbumin phosphate; the preferred proportions are 30 to 40 parts of the emulsifier fraction with the remainder protein.

In general, the process of making the complex is as follows:

A solution of the lactalbumin or lactalbumin phosphate, preferably a 20% aqueous solution, is prepared. The non-proteinaceous emulsifier is dispersed in hot water, not exceeding 140° F., and then added to the lactalbumin solution while the entire mixture is agitated. After the emulsifier is completely added and the mixture heated for a time sufficient to form the complex (ordinarily 10 minutes to 30 minutes at 120° F., to 160° F.), the entire mixture is homogenized. If desired the dried lactalbumin or lactalbumin phosphate can be added directly to the dispersion of emulsifier. The protein in the complex is substantially undenatured.

The aqueous dispersion of the complex can be used as such and consequently the amount of each fraction of the complex and the proportion of complex in the aqueous dispersion can be regulated by the amount of water used to form the solution of lactalbumin phosphate or lactalbumin and emulsifier dispersion.

The emulsifier complex of the present invention can be used in any food products requiring an emulsifier. For example, it can be used as a substitute for egg yolk in cakes, donuts, rolls, muffins, cookies, special breads and other bakery products as an emulsifier in salad dressings and high fat toppings.

The invention will be further illustrated by the following specific examples of the practice of it. In these examples, and elsewhere herein, proportions are expressed as parts by weight on the dry basis unless stated to the contrary.

Example 1

1 part of purified soya lecithin was dispersed in 15 parts of warm water (120° F.) in a stainless steel kettle equipped with stirring blades. 4 parts of dried undenatured lactalbumin phosphate was added with mixing. The mixing continued for approximately 15 minutes. The mixture was then passed through a two-stage homogenizer and homogenized at 2,500 p.s.i. in the first stage and 500 p.s.i. at the second stage. The product was then spray dried to a moisture content of about 3%. The complex was tested and found to be readily dispersible in water.

Example 2

The proceduce and composition of Example 1 are used except that the lactalbumin phosphate there used is replaced by an equal weight of undenatured lactalbumin. The resultant complex is readily dispersible in water and has excellent emulsifying properties in foods.

Example 3

The procedure and composition of Example 1 are used to prepare a series of six complexes except that the lecithin there used is replaced, respectively, by equal weights of glycerol monopalmitate, propylene glycol monostearate, glycerol lacto stearate, MYRJ, sucrose monopalmitate, and stearyl-2-lactylic acid. Each complex formed is readily dispersible in water.

Example 4

A whipped topping was prepared from the following composition:

| | Parts |
|---|---|
| Sugar | 750 |
| Lactalbumin phosphate-lecithin complex of Example 1 | 100 |
| Gelatin | 25 |
| Salt | 5 |
| Hydrogenated vegetable fat (mainly coconut) | 1,400 |
| Mono- and diglycerides | 25 |
| Monosodium phosphate derivative of mono- and diglycerides | 10 |
| Water | 4,570 |

Gelatin was added to water at 140° F. and mixed until the gelatin was dissolved. The lactalbumin phosphate-lecithin complex was added with continuous mixing and fat (previously melted at 180° F. and containing the mono- and diglycerides) was added. The mixture was homogenized in a two stage homogenizer (2,500 p.s.i. first stage, 500 p.s.i. second stage). The sugar was added and the product spray dried.

To reconstitute the topping 13 parts of the above dried mixture was added to 17 parts of ice water and whipped. The resultant whipped topping had excellent stability, taste, and texture.

Example 5

A cake mix is prepared from the following formulation:

| | Percent |
|---|---|
| Flour (6% moisture) | 37.51 |
| Sugar | 41.00 |
| Shortening | 13.70 |
| Glycerol monostearate-lactalbumin complex of Example 3 | 3.00 |
| Nonfat milk solids | 2.50 |
| Sodium bicarbonate | 0.54 |
| Sodium acid pyrophosphate | 0.15 |
| Monocalcium monohydrate | 0.55 |
| Salt | 0.90 |
| Powdered vanilla | 0.15 |

The above listed ingredients are blended with about 35% water and mixed until homogeneous. The cake is baked at an oven temperature of 360° F. to 400° F. and is equal in volume and texture to a cake prepared from an identical formulation in which the complex is replaced by an equal weight of dried egg whites.

The use of lactalbumin and lactalbumin phosphate as emulsifiers is unexpected since both alone are not surface active to any appreciable extent. The complexes of the present invention, however, containing large amounts of these proteins have excellent emulsifying properties.

It will be understood that it is intended to cover all changes and modifications of the examples of the invention herein chosen for the purpose of illustration which do not constitute departures from the spirit and scope of the invention.

What is claimed is:

1. A water-dispersible complex suitable for use as an emulsifying agent comprising from about 10 to about 50 parts by weight for each 100 parts by weight of complex of an edible non-proteinaceous emulsifier capable of forming a complex and a protein selected from the group consisting of lactalbumin and a lactalbumin phosphate.

2. A water-dispersible complex suitable for use as an emulsifying agent comprising from about 10 to about 50 parts by weight for each 100 parts by weight of complex of an edible non-proteinaceous emulsifier capable of forming a complex and lactalbumin.

3. A water-dispersible complex suitable for use as an emulsifying agent comprising from about 10 to about 50 parts by weight for each 100 parts by weight of complex of an edible non-proteinaceous emulsifier capable of forming a complex and a lactalbumin phosphate.

4. A water-dispersible complex suitable for use as an emulsifying agent comprising from about 10 to about 50 parts by weight of edible non-proteinaceous emulsifier capable of forming a complex and from about 50 to about 90 parts by weight of a protein selected from the group consisting of lactalbumin and a lactalbumin phosphate.

5. A water-dispersible complex suitable for use as an emulsifying agent comprising of from about 30 to about 40 parts by weight of a glycerol ester of a $C_{12}$–$C_{20}$ monocarboxylic fatty acid and from 60 to about 70 parts by weight of lactalbumin.

6. A food product utilizing an emulsifying agent containing as an emulsifying agent the complex of claim 1.

7. A whipping composition comprising a fat, protein, a sweetening agent, and as an emulsifying agent the complex of claim 1.

8. The method of making a proteinaceous emulsifying agent comprising the steps of forming an aqueous dispersion of an edible, non-proteinaceous emulsifying agent capable of forming a complex, adding thereto a protein selected from the group consisting of lactalbumin and lactalbumin phosphate, and heating the mixture at a temperature and for a time sufficient to complex the non-proteinaceous emulsifying agent and the protein.

9. The method of making a proteinaceous emulsifying agent comprising the steps of forming an aqueous dispersion of an edible, non-proteinaceous emulsifying agent capable of forming a complex, adding thereto a protein selected from the group consisting of lactalbumin and lactalbumin phosphate, heating the mixture at a temperature of from about 120° F. to about 160° F. for about 10 to about 30 minutes to complex the non-proteinaceous emulsifying agent and the protein, and homogenizing.

References Cited

UNITED STATES PATENTS

| 2,699,995 | 1/1955 | Hull | 99—57 |
| 2,738,275 | 3/1956 | Block | 99—19 |
| 3,224,883 | 12/1965 | Pader | 99—139 |
| 3,266,907 | 8/1966 | Kozlik et al. | 99—139 |

A. LOUIS MONACELL, *Primary Examiner.*

R. N. JONES, *Examiner.*

J. M. HUNTER, *Assistant Examiner.*